United States Patent [19]

Rühlemann

[11] Patent Number: 4,792,665

[45] Date of Patent: Dec. 20, 1988

[54] STEP COUNTER

[75] Inventor: Gerhard Rühlemann, Uttenreuth, Fed. Rep. of Germany

[73] Assignee: Kasper & Richter Feinmechanischer Apparatebau, Uttenreuth, Fed. Rep. of Germany

[21] Appl. No.: 943,495

[22] Filed: Dec. 19, 1986

[51] Int. Cl.$^4$ ............................................. G01C 22/00
[52] U.S. Cl. ..................................................... 235/105
[58] Field of Search ............................ 235/95 C, 105

[56] References Cited

U.S. PATENT DOCUMENTS 694,652  3/1902  Kuhn ..................................... 235/105
4,460,823  7/1984  Ruhlemann ......................... 235/105

FOREIGN PATENT DOCUMENTS 1925723  11/1970  Fed. Rep. of Germany ...... 235/105
2258026   3/1974  Fed. Rep. of Germany ...... 235/105

Primary Examiner—Benjamin R. Fuller
Attorney, Agent, or Firm—Fleit, Jacobson, Cohn & Price

[57] ABSTRACT

The invention relates to a movement counter with a pendulum weight pivotably mounted in a roughly vertically located plane when the instrument is in the use position and which acts on an indicating means with which is associated a scale for the distance covered and whose pendulum part can be set by a manually adjustable stop, whose adjusting means project through an opening in the casing. Apart from the scale for indicating the distance covered, a second scale is provided, whereon the indicating means indicates the average step length after covering a predetermined distance.

8 Claims, 3 Drawing Sheets

STEP COUNTER

BACKGROUND OF THE INVENTION

The present invention relates to an instrument for determining a distance covered by a walking or running person, with a pendulum, whose travel can be set by means of a setting means in proportion to the average step length of the person, with a transmission and counting means for the transfer of the number of pendulum swings to an indicating means provided with a pointer, with a first indicating means scale for the distance covered and with a second scale coupled with the travel of the setting means for the step length.

An instrument of this type, which can also be called a movement counter, is described in German Pat. No. 2 258 026. In this known movement counter the step means is set in accordance with what the user believes or estimates is the average step length of the user, so that the particular distance covered can be read off the scale.

SUMMARY OF THE INVENTION

The problem solved by the present invention is to so construct a movement counter of the aforementioned type, that the average step length of the user can be simply determined with great accuracy using the counter.

According to the invention, this problem is solved in that apart from the first scale for the distance covered or traveled, a third scale is provided on the counter for determining the average step length of the user person, with a mark of a predeterminable standard distance on the first scale and a mark for a given standard step length on the third scale being congruent. For this purpose, additional marks are provided on the third scale for different, average step lengths. The locations of the marks on the third scale have been determined from the quotient of the standard distance and the particular number of steps which are required to cover the standard distance using respective average step lengths. After the user person's average step length has been determined using the counter, an actual unknown distance covered is indicated by additional marks on the first scale, after covering the actual distance with the determined average step length of the user person set in the counter by adjusting means using a second scale.

In the case of the instrument according to the invention, for determining the average step length of the user, he covers a given distance of e.g. 400 m, which corresponds to the length of a cinder track in a sports stadium or the like. He can then directly read off the average step length and correspondingly set the adjusting means.

A particularly accurate step length setting is made possible in that a scale member carrying the third scale is displaceably arranged along the first scale and is coupled with the setting means for transferring a movement of the scale member to the setting means and the control path of the pendulum setting means and the transmission and counting means are matched to one another in such a way that a setting of the actual step length on the setting means can be performed by guiding the scale member from a starting position, in which the marking of the standard distance and the standard step length are congruent, into an end position, in which the standard step length marking coincides with the position of the pointer.

Another advantageous further development of the invention comprises the second and third scales being combined in a common scale and the latter is adjustable as a marking ring along the adjusting path of the setting means and concentric to the first scale.

The invention is described in greater detail hereinafter relative to two embodiments and the attached drawings.

DESCRIPTION OF TWO PREFERRED EMBODIMENTS

Figure 1:
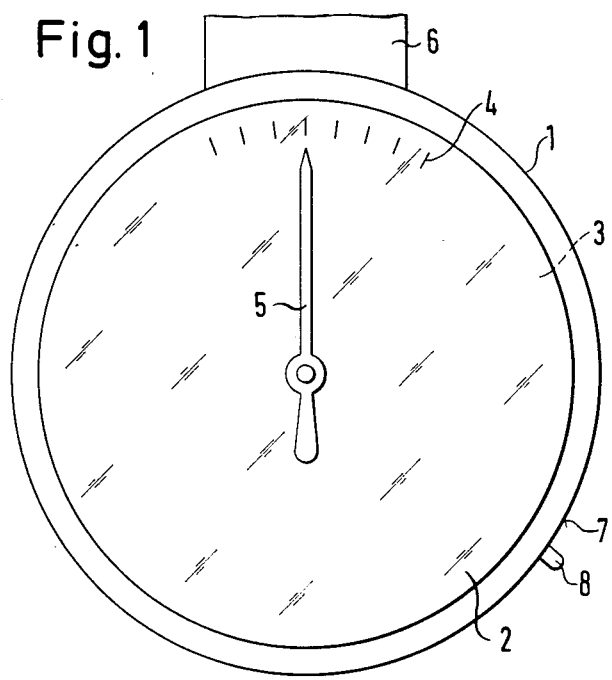
FIG. 1 shows a plan view of a first instrument for determining a distance covered by a running or walking person.
Figure 2:
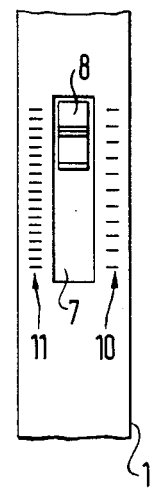
FIG. 2 shows a partial side view of the instrument of FIG. 1.
Figure 3:
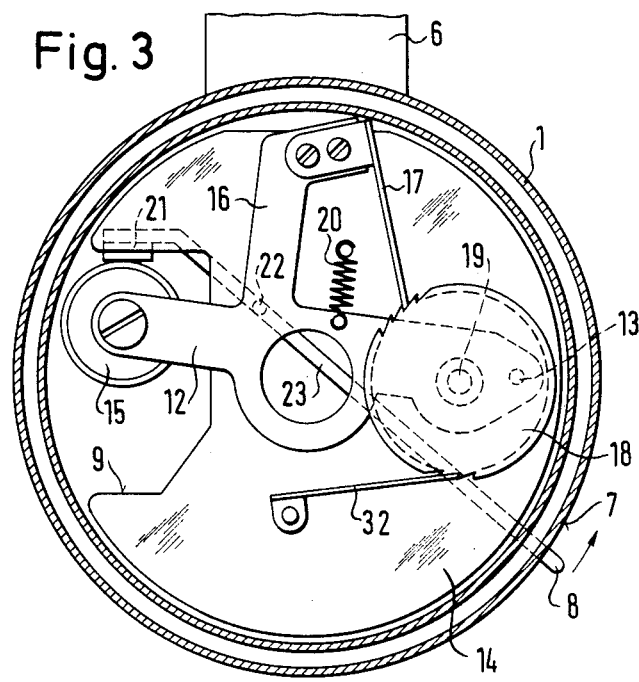
FIG. 3 shows a plan view of an open instrument according to FIG. 1.
Figure 4:
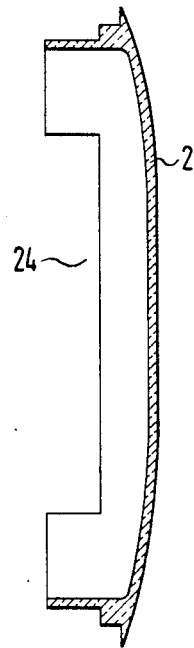
FIG. 4 shows a cross-section through a cover of the instrument according to the preceding drawings.

The first and second movement counters according to FIGS. 1, 2 and 4 have a casing 1, which is closed by a cover 2 made from transparent material. Cover 2 covers a scale disk 3 applied to a first scale 4 for distance covered. A pointer 5 indicates the movements. Casing 1 has a partly represented attachment 6 by which the instrument can be fixed to a moving object or a human. Casing 1 has a lateral slot 7 (FIGS. 2 and 3), through which a handle 8 projects to the outside and is used for setting an average step length.

FIG. 3 shows the construction of the measuring means of the movement counters. A swivel arm 12 is swivellably mounted by one end thereof on a shaft 13, which is fixed to a work plate 14 of the instrument. At its free end swivel arm 12 carries a pendulum weight 15, which can swing in a recess of workplate 14 and a further workplate facing the first workplate 14. Swivel arm 12 carries an arm 16, to whose end is fixed an indexing spring 17, whose free end engages in the teeth of an indexing wheel 18. The latter is mounted in rotary manner on the workplate 14 with a shaft 19 and by means of a gear advances the pointer 5 in known, stepwise manner. By means of a spring 20, fixed on swivel arm 12 and workplate 14, swivel arm 12 is kept in the inoperative position of the instrument in such a way that the pendulum weight 15 is pressed against a stop 21. A retaining pawl 32 ensures that the indexing wheel 18 cannot move counter to the normal direction of advance. Stop 21 is fixed to the shorter lever arm of a lever 23 pivotably mounted on a spindle 22 and whose right end forms the handle 8 projecting through slot 7 and a recess 24 of casing cover 2 aligned therewith (FIG. 4). The control or regulating path of stop 21 is smaller than the corresponding control or regulating path of handle 8, so that a particularly precise setting of the average step length of the user is possible through the second scale 10, 11.

The travel of pendulum weight 15 is on the one hand limited by stop 21 and on the other by the edge 9 of workplate 14.

Figure 5:
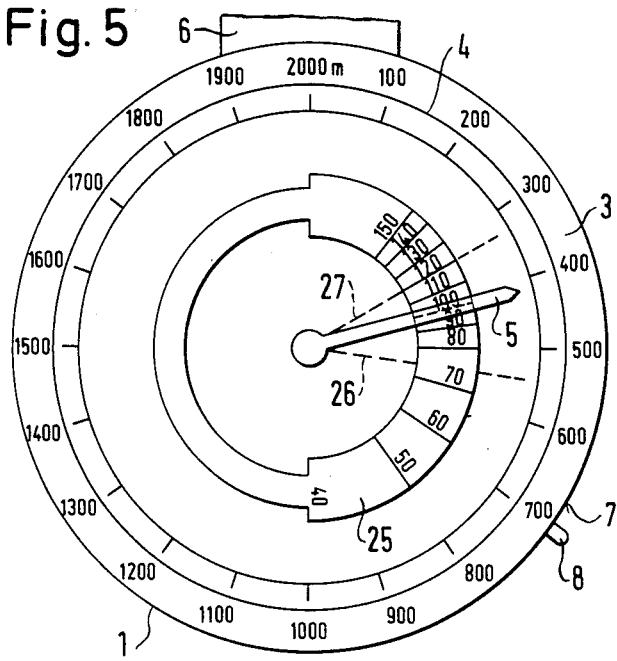
FIG. 5 shows a plan view of an indicating means of the instrument according to the preceding drawings.

FIG. 5 shows that in a first instrument, a third scale 25 is positioned alongside the first scale 4 for indicating the distance covered. These scales 4, 25 are in the form of concentric rings on scale disk 3 and are so arranged and subdivided that pointer 5 indicates the average step length on the third scale 25 after covering a predetermined distance. In the embodiment according to FIG. 5, pointer 5 would point precisely at a marking of 400 m and an aligned congruent marking of 1 m, after covering 400 m with an average step length of 1 m. If the average step length is shorter, then after covering 400 m it would indicate a greater distance covered, whereas if it is longer it would indicate a shorter distance covered. The average step length can always be read on the third scale 25 (the dotted line pointer positions 26 and 27 for step lengths of 75 and 120 cm are given as examples).

By means of the second scale 10, 11, handle 8 can be set in accordance with the average distance determined so that pointer 5 on scale 4 then precisely indicates the distance covered.

Figure 6:
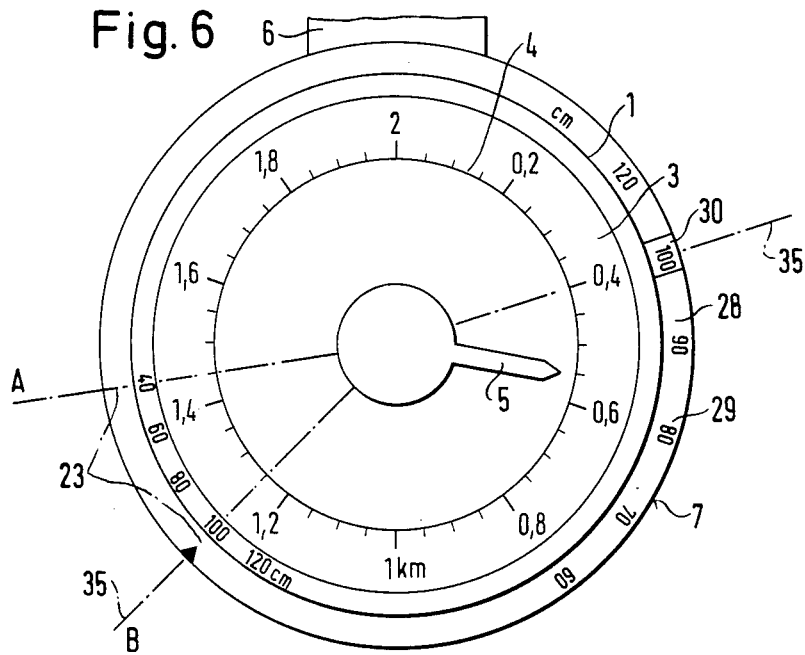
FIG. 6 shows a plan view of indicating means of a second instrument.

In the case of the design of the indicating means for a second instrument according to FIG. 6, the first scale 4 is e.g. calibrated in Km. Stop 21 (FIG. 3) is non-displaceably coupled with a graduated ring 28 and is consequently adjustable by the latter. Graduated ring 28 is coaxial to pointer 5 and the scale 4 is rotatable about casing 1 and provided with a step length scale 29, which corresponds to the third scale 25 in the first instrument (FIG. 5) and indicates the average step length. Graduated ring 28 also carries a mark 30 for the standard step length, which is here e.g. 1 m. It is firstly set to a measuring distance, which can also be called the standard distance of e.g. 0.4 Km. After covering this distance, pointer 5 indicates the average step length on the step length scale 29. In the embodiment shown in FIG. 6, an average step length of 85 cm is indicated on step length scale 29. The first scale 4 can be ignored.

If mark 30 is then set congruently with pointer 5, then simultaneously stop 21 is adjusted and the pendulum travel is adapted to the measured, average step length.

In FIG. 6, 35 is the congruent setting between mark 30 and the standard measuring distance of 0.4 Km. Lever 23 occupies position B, which will be described in greater detail relative to FIG. 7. If graduated ring 29 was set to a pointer position corresponding to an average step length of 40 cm, then lever 23 would assume position A.

Figure 7:
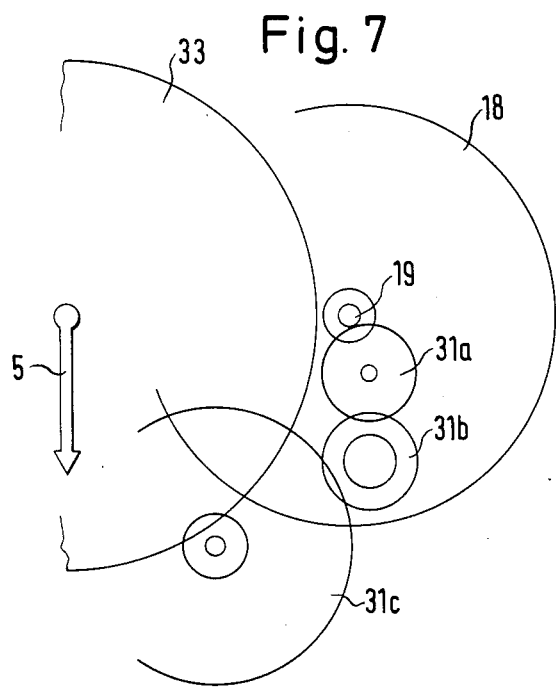
FIG. 7 diagrammatically shows a gear for an instrument according to FIGS. 1 to 6.

FIG. 7 purely diagrammatically shows the gear by which the movement of indexing wheel 18 is transferred to pointer 5. This gear serves as a transmission means in order to fix the swing of pointer 5 as a function of the counting or measuring means in accordance with the scale graduations.

By means of the shaft 19 constructed as a rack, indexing wheel 18 is in engagement via three pinions 31a, 31b and 31c with a central gear 33 on whose spindle pointer 5 is positioned in non-rotary manner. In order to make the drawing easy to understand, the individual gears and pinions are merely shown as circles.

Figure 8:
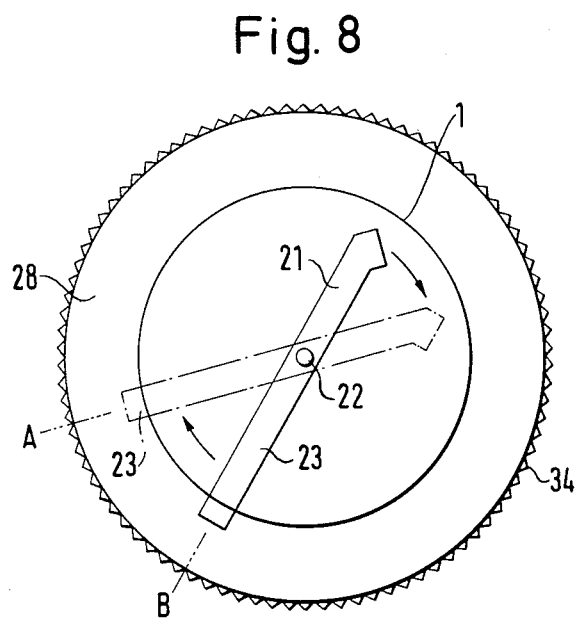
FIG. 8 shows a detail of the second instrument according to FIG. 6 with the cover removed.

FIG. 8 illustrates a detail of the second instrument according to FIG. 7 with the casing cover removed. It can in particular be seen that the lever 23 with stop 21 is coupled in non-displaceable manner to graduated ring 28. Thus, if the graduated ring 28 is turned with respect to casing 1, then stop 21 is adjusted and the travel of the pendulum modified. First position A and second position B are shown in accordance with FIG. 7. To facilitate handling in the present embodiment, graduated ring 28 is provided on its outer circumference with serrations 34.

The function of the second instrument will now be described relative to FIGS. 6 and 8. For determining the average step length, mark 30 is set congruently with the indication of a standard distance on the first scale 4 with the aid of a graduated ring 28, which can also be called a scale handle. In the embodiment shown in FIG. 6, the standard distance is 0.4 Km. In the present embodiment, mark 30 corresponds to a standard step length of 1 m. By turning graduated ring 28, in accordance with FIG. 8 lever 23 and consequently the pendulum travel are adjusted. Thi travel and the transmission means comprising indexing wheel 18, pinions 31a, 31b, 31c and central gear 33 are adjusted in such way that after covering the standard distance with a step length precisely corresponding to the standard step length set on mark 30, pointer 5 points to the standard distance mark on the first scale 4. It is obviously possible to provide distances other than standard distances and step lengths other than standard step lengths, if the transmission means and pendulum travel are correspondingly adapted.

If the standard distance does not precisely correspond to the set standard step length, then pointer 5 indicates on graduated ring 28 a different average step length, e.g. 0.85 m in FIG. 6. This actual step length is set on the second instrument in that the graduated ring 28 is turned and mark 30 is set congruently with the pointer position. This measure leads to the simultaneous adjustment of lever 23 and the pendulum travel and adapts the actual step length.

It is obviously readily possible to provide the individual scales with British/American units instead of having a metric subdivision. Thus, e.g. the first scale could be in yards or miles and the second and third scales in feet.

What is claimed is:

1. An instrument for determining an average step length of and a distance traveled by a walking or running user person, comprising:
  a support means;
  first scale means on the support means for determining the distance traveled by the user person;
  second scale means on the support means for setting an average step length of the user person, the second scale means including a marking corresponding to a preselected standard average step length;
  third scale means on the support means for determining an actual average step length of the user person, the first and third scale means including markings corresponding to a preselected standard travel distance and a preselected standard average step length, respectively, and the first and third scale means being calibrated with progressively increasing indicia in opposite directions;
  indicator means mounted on the support means for movement relative to the first and third scale means;
  a movable member mounted on the support means for movement in response to each step of the user person and connected to the indicator means for moving the indicator means;
  setting means on the support means for setting the standard average step length and the average step length of the user person on the second scale means;

limiting means on the support means connected to the setting means and responsive to the setting of the setting means on the second scale means, for limiting the extent of movement of the movable member; and drive means on the support means connected to the movable member and the indicator means and responsive to the movement of the movable member for moving the indicator means relative to the first and third scale means in proportion to the setting of the setting means on the second scale means so that when the preselected distance has been traveled by the user person with the setting means set at the standard average step length marking on the second means, the position of the indicator means on the third scale means indicates the average step length of the user person, to provide an appropriate value for setting the setting means on the second scale means, and so that when an unknown distance is then traveled by the user person with the setting means set at the provided value on the second scale means, the indicator means indicates the actual distance traveled on the first scale means.

2. The instrument recited in claim 1, wherein the third scale means on the support means directly indicates the actual average step length of the user person as the quotient of the preselected standard travel distance and the number of movements of the movable member on the support means in response to the steps of the user person.

3. The instrument recited in claim 1, wherein the first and third scale means on the support means are fixed relative to one another and the preselected standard travel distance and average step length markings are aligned in congruent relationship.

4. The instrument recited in claim 1, which further comprises:

a rotatable member on the support means and having third scale means, including the preselected standard average step length marking, formed thereon;

the rotatable member being rotatable relative to the first and second scale means on the support means and also defining a part of the setting means; and the rotatable member being rotatable to align the preselected standard average step length marking in congruent alignment with the preselected standard travel distance marking on the first scale means, for determining the actual average step length of the user person, and subsequently being rotatable to align the preselected standard average step length marking with the indicating means to set the setting means to the determined actual step length of the user person.

5. An instrument as recited in claim 1, wherein the movable member is a pivotably mounted pendulum on the support means having an amplitude which is adjusted by the setting means and the limiting means connected to the setting means, to correspond to the average step length indicated on the second scale means.

6. An instrument is recited in claim 5, wherein the setting means includes an adjustable pivoted lever on the support means, the pivoted lever having a pendulum stop adjacent one end defining the limiting means, for limiting the movement and also determining the amplitude of the pendulum, and the pivoted lever having an opposite end projecting adjacent the second scale means.

7. An instrument as recited in claim 4, wherein the movable member is a pivotably mounted pendulum having an amplitude which is adjusted by said setting means and the limiting means connected to the setting means, to correspond to the average step length indicated on the second scale means.

8. An instrument as recited in claim 7, wherein the setting means includes an adjustable pivoted lever on the support means, the pivoted lever having a pendulum stop adjacent one end defining the limiting means, for limiting the movement and also determining the amplitude of the pendulum, and wherein the lever and stop are coupled to the rotatable member and are movable therewith.

* * * * *